United States Patent
Detro et al.

(10) Patent No.: US 6,873,480 B2
(45) Date of Patent: Mar. 29, 2005

(54) METHOD AND APPARATUS FOR PACKAGING OPTICAL ELEMENTS

(75) Inventors: Michael Detro, Los Gatos, CA (US); Arthur Berman, San Jose, CA (US)

(73) Assignee: Lightmaster Systems, Inc., Santa Clara, CA (US)

( * ) Notice: Subject to any disclaimer, the term of this patent is extended or adjusted under 35 U.S.C. 154(b) by 48 days.

(21) Appl. No.: 10/290,867

(22) Filed: Nov. 7, 2002

(65) Prior Publication Data

US 2003/0090810 A1 May 15, 2003

Related U.S. Application Data

(60) Provisional application No. 60/349,272, filed on Jan. 14, 2002, and provisional application No. 60/348,226, filed on Nov. 8, 2001.

(51) Int. Cl.[7] .......................... G02B 27/00; G02B 5/00; G02B 7/00
(52) U.S. Cl. .......................... 359/894; 359/832; 385/16
(58) Field of Search .......................... 359/894, 831–832; 385/16, 18, 19

(56) References Cited

U.S. PATENT DOCUMENTS

| | | |
|---|---|---|
| 1,277,040 A | 8/1918 | Brewster |
| 4,151,554 A | 4/1979 | Tucker |
| 4,544,237 A | 10/1985 | Gagnon |
| 4,679,894 A | 7/1987 | Pavlath |
| 4,711,529 A | 12/1987 | Baker |

(Continued)

FOREIGN PATENT DOCUMENTS

| | | | | |
|---|---|---|---|---|
| EP | 0580169 A2 | | 1/1994 | |
| EP | 000580169 | * | 1/1994 | ........... G02B/26/08 |
| GB | 2 027 956 | | 2/1980 | |
| JP | 04-005428 | | 7/1993 | |
| JP | 04-151008 | | 12/1993 | |
| JP | 07-041358 | | 8/1996 | |

OTHER PUBLICATIONS

Copy of International Search Report dated Mar. 28, 2003 for PCT/US02/35944.

*Primary Examiner*—Leo Boutsikaris
(74) *Attorney, Agent, or Firm*—Reed Smith LLP; John W. Carpenter

(57) ABSTRACT

An optical element is disposed between cover glasses, and an optical coupling liquid is injected between the optical element and the cover glasses to form an optical package. An adhesive provides a liquid tight seal between the cover glasses. The optical element is a retarder, filter, polarizing film, or other optical element. Spacers are placed between the optical element and cover glasses to maintain space between the optical element and the cover glasses and assist in distribution of the optical coupling liquid. Applications include prism assemblies and other optical products. The invention may also be applied to joining optical components with liquid joints. For example, an optical switch includes a controllable retarder in a liquid filled joint.

64 Claims, 10 Drawing Sheets

U.S. PATENT DOCUMENTS

| | | |
|---|---|---|
| 4,720,171 A | 1/1988 | Baker |
| 4,720,172 A | 1/1988 | Baker |
| 4,720,174 A | 1/1988 | Baker |
| 4,737,019 A | 4/1988 | Baker |
| 4,749,258 A | 6/1988 | Baker |
| 4,755,038 A | 7/1988 | Baker |
| 4,773,736 A | 9/1988 | Baker |
| 4,781,426 A | 11/1988 | Baker |
| 4,784,470 A | 11/1988 | Baker |
| 4,790,633 A | 12/1988 | Baker |
| 4,792,212 A | 12/1988 | Baker |
| 4,813,769 A | 3/1989 | Baker |
| 4,913,509 A | 4/1990 | Baker |
| 5,055,922 A | 10/1991 | Wessling |
| 5,168,351 A | 12/1992 | Bradley |
| 5,177,629 A * | 1/1993 | Bohannon ................ 349/74 |
| 5,497,268 A * | 3/1996 | Tang ...................... 359/513 |
| 5,838,397 A * | 11/1998 | Stephens .................. 349/5 |
| 6,046,858 A | 4/2000 | Scott et al. |
| 6,056,407 A | 5/2000 | Iinuma et al. |
| 6,115,484 A | 9/2000 | Bowker et al. |
| 6,144,791 A | 11/2000 | Wach et al. |
| 6,404,941 B1 | 6/2002 | Picard et al. |
| 6,406,151 B1 | 6/2002 | Fujimori |
| 6,504,661 B1 | 1/2003 | Odille et al. |
| 2001/0024556 A1 * | 9/2001 | Beguin et al. ............ 385/125 |
| 2002/0001135 A1 | 1/2002 | Berman et al. |
| 2002/0119601 A1 * | 8/2002 | Jiang ...................... 438/118 |

* cited by examiner

METHOD AND APPARATUS FOR PACKAGING OPTICAL ELEMENTS

CROSS REFERENCE TO RELATED APPLICATIONS AND CLAIM OF PRIORITY

This invention claims priority to the following co-pending U.S. provisional patent applications, which are incorporated herein by reference in their entirety:

Detro, Provisional Application Ser. No. 60/349,272, entitled "An Improved Means of Packaging a Retarder Material," filed, Jan. 14, 2002; and Berman, Provisional Application Ser. No. 60/348,226, entitled "An Improved Configuration and Means of Fabricating Optical Assemblies Used for Optical Switching," filed Nov. 08, 2001.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to the field of optical elements, and more particularly to the packaging of optical elements. The invention is yet further related to packaging of retarder type optical elements.

2. Discussion of Background

A retarder is an optical element often used in optical systems. Retarders can be made from a variety of materials. One important class of these materials is plastics such as polycarbonate. A design that includes a retarder may require that it be optically bonded to other components within the assembly. These "other" components are often various types of glass. Accomplishing the bond can present a challenge in that any adhesive used for this purpose should meet a number of requirements. The following is a list of some of these requirements:

Be optically clear.

Adhere to the plastic, glass, or any thin film coating that may be present in a device or other optical configuration to which the retarder is to be affixed.

Not chemically react with the plastic, glass or any thin film coating that may be present.

Not yellow or otherwise "age" with exposure to intense light flux.

Have a coefficient of thermal expansion similar to that of the plastic, glass, or any thin film in the device or optical configuration to which it is affixed.

Have an index of refraction close to that of the plastic, glass, or any thin film in the device or optical configuration to which it is affixed.

Have a suitably long shelf life.

Have a suitably long pot life (pot life=glue stays liquid or gel-like until cured), so that the optical elements can be placed in their required positions prior to the adhesive fully curing.

Be simple to prepare (such as mix and degas for two part adhesives).

Have a viscosity appropriate to the means of application (thick enough to work with, but thin enough so that it adequately and evenly coats all areas to the glued).

Be inexpensive to buy and use.

Ideally, the adhesive should meet all of these requirements. The reality is that, for some applications, such an adhesive may not exist, particularly in high light or heat intensive environments. One specific application for which these requirements are difficult, or currently impossible to meet is in a prism assembly of a video projector. The result is a practical problem: how can the retarder be efficiently included in the prism assembly of a video projector?

A partial solution to this problem (adopted by at least one company that sells wavelength specific retarder materials to the prism industry) is to produce a retarder "sandwich". An example is illustrated in FIG. 1, which includes a retarder 100, cover glasses 110, and 120, and rigid adhesive 130. As shown, the retarder 100 is laminated between the two cover glasses 110 and 120. The purpose of creating such a product is to make it easier for the customer to laminate the retarder into their optical assembly. The approach is successful in that customers need deal with only the relatively simpler task of laminating the outer glass surfaces of the sandwich to other glass components (e.g., prism(s)) in their optical assembly. On the other hand, the fabricator of the sandwich is still left with the more difficult task of laminating the retarder to the cover glasses, which generally includes the difficulties and requirements listed above, and at elevated cost.

Consider the details of the sandwich illustrated in the FIG. 1. The sandwich is composed of a retarder 100 that has been laminated between cover, glasses using a rigid adhesive 130. This is representative of retarder sandwiches commercially available at this time. The requirements on the bonding adhesive that are listed above must still be addressed in fabricating the sandwich. The result is a sandwich that is expensive and difficult to manufacture. More importantly, the result is a sandwich that may still not fully meet the requirements.

Stress build up and the negative effects of stress (e.g., stress induced birefringence) is a problem also found in optical devices other than retarder sandwiches Most modern optical communication systems utilize photonic pathways and Optical-Electronic-Optical (O-E-O) control elements. (In this document, the term control elements refers to components that perform functions such as multiplexing, demultiplexing, routing, etc.). Although capable of performing the required tasks, O-E-O control elements are expensive, "slow" to respond, incapable of handling signals not conforming to standard data rates and consume significant power. One approach to addressing the deficiencies of such control elements is through the use of Optical-Optical-Optical (O-O-O) control elements. During the past few years, many different types of O-O-O control elements have been proposed. The functioning of some of these is based on the manipulation of polarized light. A small sample of such devices can be found in the following U.S. Pat. Nos. 4,679,894; 4,711,529; 4,720,171; 4,720,172; 4,720,174; 4,737,019; 4,749,258; 4,755,038; 4,773,736; 4,781,426; 4,784,470; 4,790,633; 4,792,212; 4,813,769; and 4,913,509.

It is important to the proper operation of any optical device that manipulates polarized light that the polarization not be altered by spurious and/or uncontrolled optical effects. More specifically, it is important that stress induced birefringence be minimized along the optical path. Origins of stress can include that stress built into the optical assembly during its fabrication and that stress generated by change in temperature (due to differing Coefficients of Thermal Expansion (CTE) between the various components within the optical assembly). Note that one feature common to the configuration of almost all previously disclosed O-O-O control elements is that the components are held together using an adhesive. The significance of this point is that the rigid bond between the optical components is not "accommodative". That is, the rigid bond transmits stress and allows the stress to build up rather than providing a mechanism for stress reduction.

SUMMARY OF THE INVENTION

The present inventor has realized the need for providing packaging for optical elements such that they may be efficiently constructed and easily fitted into optical assemblies (e.g., fitted into prism assemblies or light engines). The present invention is a new configuration for packaging optical elements. In one embodiment, the optical element is a retarder. In the case of a retarder optical element, the packaging provided by the present invention eliminates the difficulties encountered in the conventional preparation of a retarder sandwich while retaining its advantages.

In one embodiment, the present invention provides an optical package, comprising, first and second cover glasses, an optical element disposed between the first and second cover glasses, and an optical coupling liquid distributed between the optical element and at least one of the cover glasses.

The present invention also includes various methods of constructing an optical package. For example, a method, comprising a step of sealing an optical element and an amount of optical coupling liquid between two cover glasses to produce an optical package. In another embodiment, a method, comprising the steps of positioning a first cover glass, positioning an optical element on the first cover glass, forming an adhesive bead on the first cover glass and at least part way around the optical element, positioning a second cover glass over the optical element and contacting the adhesive bead, and filling an area bounded by the cover glasses and adhesive containing the optical element with an optical coupling liquid. In yet another embodiment, a method, comprising the steps of, fitting an optical element between a first cover glass and a second cover glass, sealing the cover glasses to create a liquid tight holding area including the optical element between the cover glasses, and filling the holding area with an optical coupling liquid.

The invention includes a configuration and means of fabricating optical assemblies (more specifically, O-O-O control elements) such that stress induced birefringence is minimized. Therefore, in yet another embodiment, the present invention provides an optical assembly, comprising at least two optical components separated by a gap, a frame fitted around the optical components, and optical coupling fluid in the gap. The present invention also includes an O-O-O switching device comprising, a set of optical components configured as an O-O-O switch, and optical coupling fluid disposed in each of joints in a lightpaths of the O-O-O switch.

The present invention also includes a method, comprising the steps of positioning a set of optical components for use in an optical device, fixing a frame around at least two of the optical components and a gap between the at least two optical components, and filling interior spaces bounded by the at least two optical components and the frame with optical coupling fluid.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
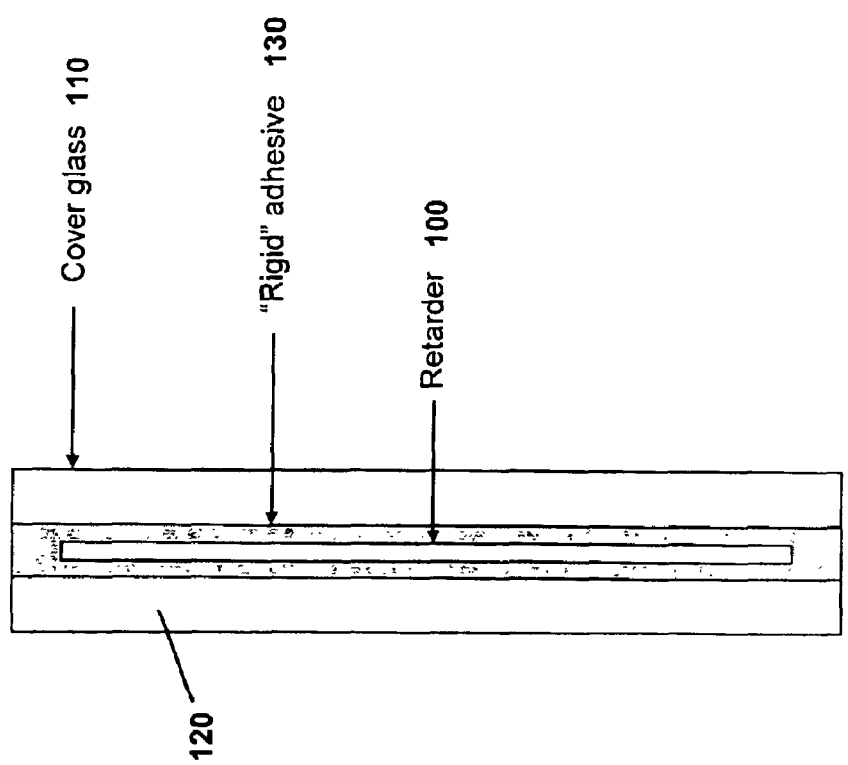
FIG. 1 is a drawing of a conventional retarder "sandwich" used to package a retarder optical element.
Figure 2:
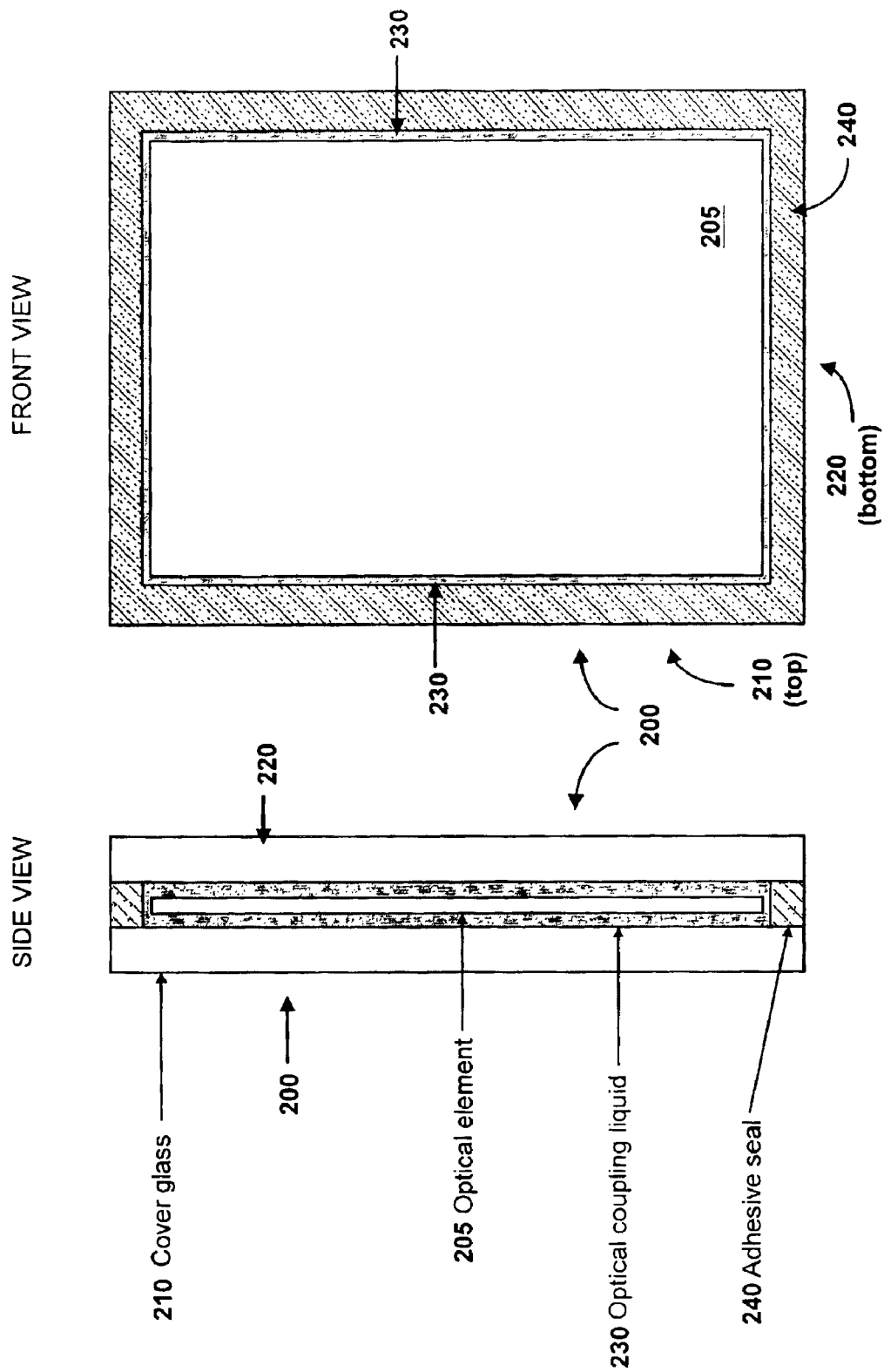
FIG. 2 is a side view and front view of packaging for an optical element according to an embodiment of the present invention.

Referring again to the drawings, wherein like reference numerals designate identical or corresponding parts, and more particularly to FIG. 2 thereof, there is illustrated a side view and a front view of an optical element package 200 according to an embodiment of the present invention. The optical element package 200 includes an optical element 205 contained between two cover glasses 210 and 220. An optical coupling liquid 230 fills interior spaces of the package 200. The optical coupling liquid 230 is maintained between the two cover glasses 210 and 220 via an adhesive seal 240. The optical coupling liquid is, for example, a clear liquid having an index of refraction equivalent to, or closely approximating, an index of refraction of the cover glasses 210 and 220. In one embodiment, the optical coupling liquid is a mineral oil, however, any index matching liquid having suitable properties may be utilized.

The advantages of the optical element package include the following:

The optical coupling liquid eliminates (or greatly reduces) internal reflections between the cover glasses and the optical element, and reduces/eliminates consequent light loss.

The optical coupling liquid accommodates differing coefficients of thermal expansion between the optical element and glass covers. Any stress that does build up is more evenly distributed than in the prior design utilizing "rigid" adhesives.

The liquid is not required to stick to either the optical element (e.g., plastic retarder material) or either of the cover glasses.

The package is inexpensive to fabricate an does not require complex manufacturing equipment.

The optical coupling liquid is generally not reactive to the optical element, adhesive, and glass components of the package.

Figure 3:
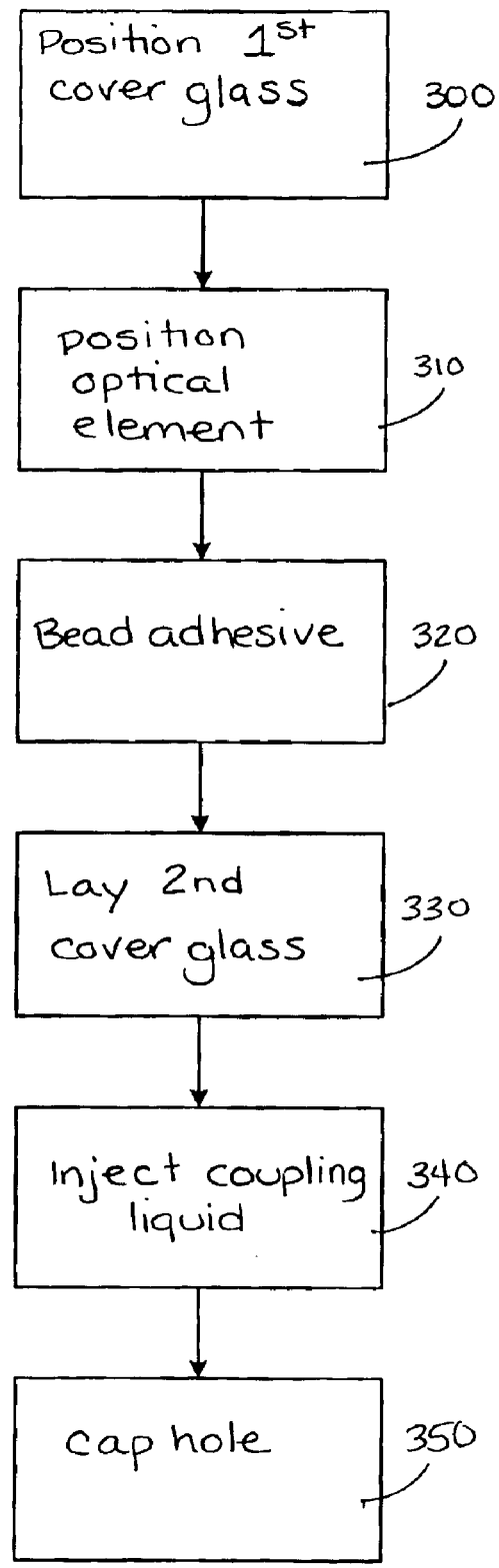
FIG. 3 is a flow chart of an example method for constructing an optical package according to an embodiment of the present invention.

The optical element package may be constructed via any number of techniques. An example method is illustrated in FIG. 3. At step 300, one of the cover glasses is positioned. The cover glass is preferably laid flat on an assembly bench. The optical element is then positioned (e.g., placed on the 1st cover glass at a generally central location so that the optical element is surrounded by a perimeter of cover glass when viewed from above) (step 310), and an adhesive bead is formed around the around the edges of the positioned cover glass surrounding the optical element (step 320) (see, for example, adhesive seal 240). The adhesive bead is continuous, and may be fitted with a fill hole, or other gap in the bead to be used for later injection of optical coupling liquid. At step 330, the second cover glass is gently placed on the top of the adhesive bead. The adhesive bead is cured, either by waiting for it to cure or activating the curing process (e.g., exposing UV cured adhesive to UV light). At step 340, optical coupling liquid is injected into the fill hole (filling process), and, at step 350, the fill hole is capped (e.g., inserting a plug in the fill hole or filling the fill hole with adhesive and curing). The finished product is similar to that illustrated in FIG. 2.

One practical issue related to constructing the optical element package is keeping a small gap between the retarder and the cover glasses. A gap is helpful to allow liquid to flow and fully fill the space between the components (between the inside faces of the cover glasses and the optical element). One method for maintaining the small gap is to place spacers on the optical element. The spacers may be small dabs of adhesive placed on the optical element. In one embodiment, the small dabs of adhesive are placed at four corners on each side of a square optical element (e.g., note adhesive dabs 660 in FIG. 6). The four corner dabs are cured before the optical element is positioned in the package (e.g., step 310). However, the number of dabs of adhesive and their positions on the optical element may be varied. Generally, the dabs are preferably placed along a perimeter (or corners) of the optical element package and in a position outside intended light paths of the package. In one embodiment, instead of the optical element, the dabs are placed on locations of the inside faces of the cover glasses. The dabs perform a spacing function to maintain a gap between the optical element and inside faces of the cover glasses to allow easier filling with optical coupling liquid.

Figure 4:
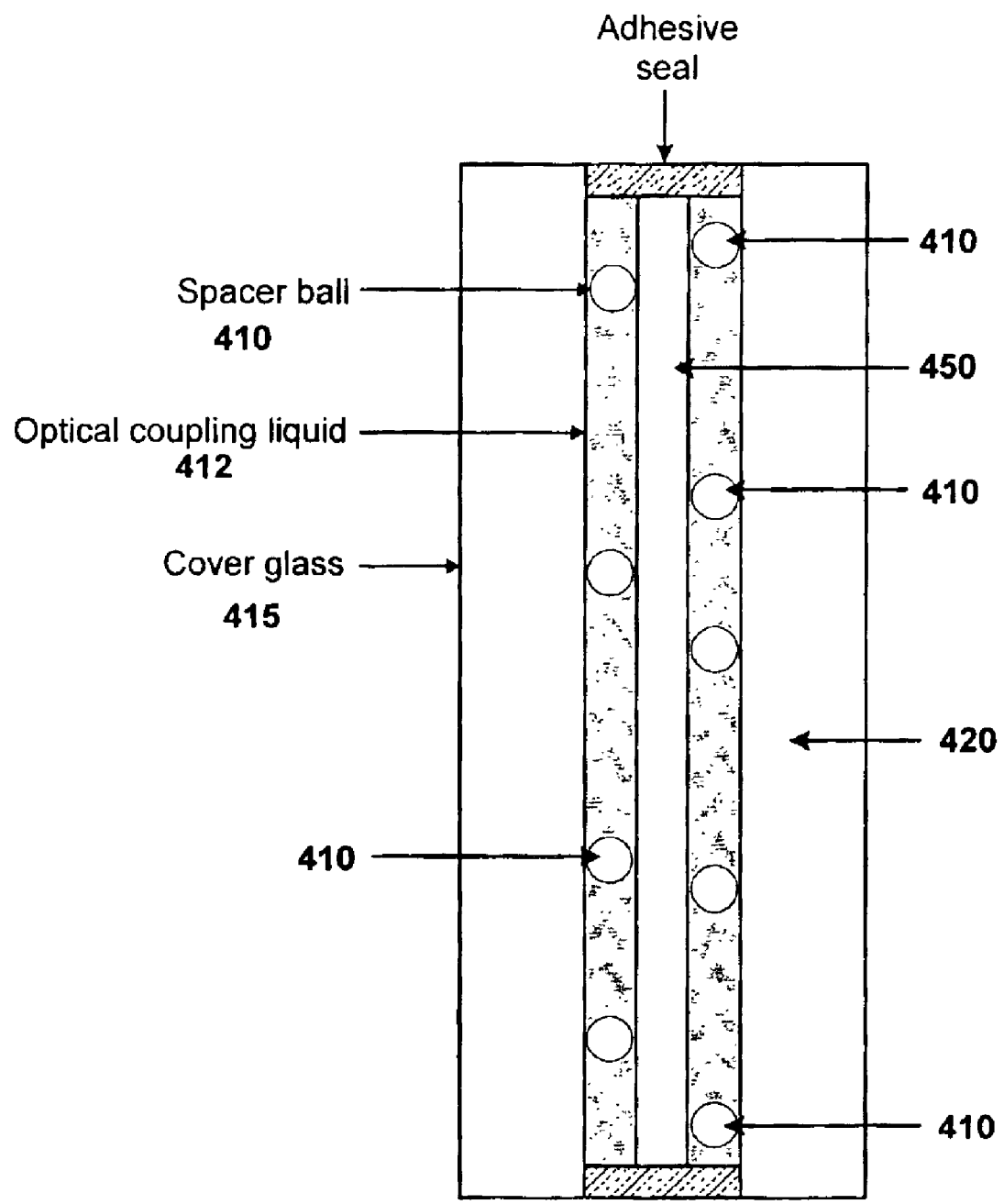
FIG. 4 is a drawing of another embodiment of an optical element package according to the present invention.

Another method for holding the optical element off the cover glasses (maintaining the gap between the optical element and cover glasses) is illustrated in FIG. 4. Small spacer balls 410 have been randomly distributed on the faces of the component (e.g., internal faces of the cover glasses 415/420, and/or surfaces of the optical element 450) before their assembly. The spacer balls 410 are preferably transparent (e.g., constructed of glass or plastic) and have an index of refraction that is matched to the index of refraction of the optical coupling liquid 412. The optical coupling liquid is also preferably matched to the index of refraction of the cover glasses (the cover glasses themselves are typically a glass based material, but may also be constructed of plastic or other materials). In this way, the balls are rendered essentially invisible.

The various embodiments of the optical element package will normally be used in an intense light environment with a potential of a considerable amount of heat build up. Although the optical coupling liquid evenly distributes stress, certain provisions are envisioned to further reduce stress or the impact it will have on the optical qualities of the optical element package. Therefore, in one embodiment, the optical element package includes an air bubble (e.g., see air bubble 640 in FIG. 6) that is inserted within the area between the cover glasses. The air bubble expands and contracts to compensate for expansion/contraction of the optical coupling liquid, cover glasses, optical element, and any other components of the package. Other devices or techniques may also be utilized to compensate for the expansions and contractions of the optical element package. The air bubble will generally float to a top portion of the optical element package (e.g., near the adhesive seal) and therefore be situated out of lightpaths passing through the optical element package during use in light engines or other optical devices.

In designs that are envisioned for use in a device that holds the optical element package in a horizontal position (e.g., a face of the prism being horizontal), other arrangements, such as special air bubble chambers, attached air bladders, etc., may be utilized to more positively position the air bubble out of light paths through the optical element package.

The spacer balls perform the spacing function. The small spacer balls have been distributed (e.g., randomly or an ordered distribution may be utilized) on the faces of the components before their assembly. In one embodiment, the spacer balls are applied only to a portion of the optical element or cover glass (e.g., perimeter). The spacer balls are, for example, on the order of 1000ths of an inch in diameter (e.g., $\frac{1}{1000}$–$\frac{1}{5000}$th of an inch in diameter), however, other diameters may be utilized.

The optical element package using spacers may be constructed via any number of techniques. One method includes placing an adhesive around the edges of one of the cover glasses and randomly dispersing spacers on the cover glass within the perimeter of the adhesive. The optical element is then gently placed over the spacers and within the perimeter of the adhesive. Additional spacers are then randomly dispersed on top of the optical element, or, alternatively, on the inside face of the second cover glass. The second cover glass is then fitted over the second layer of spacers and affixed to the adhesive. Finally, the optical coupling liquid is injected between the optical element and cover glasses. The injection process may be performed by inserting a syringe type device through the adhesive and between the optical element and a cover glass (for example, during pot life of the adhesive). Injection of the optical coupling liquid requires some steps to assure that the injection device (e.g., syringe) does not get clogged by the adhesive which it is being inserted through (e.g., maintaining adequate pressure of the optical coupling fluid in the needlepoint of the syringe, or other methods). The injection device must have sufficient fluid and be capable of delivering the proper quantity of liquid into the optical element package.

One problem in filling the package is air removal, and several options are provided for allowing air to escape during the filling process. In one embodiment, two holes are made through the adhesive, a first hole for filling the package with the liquid, and a second hole to allow air to escape.

In another embodiment, the empty spaces within the optical element package are evacuated to form a vacuum prior to injecting the optical coupling liquid. After filling the package with the liquid, air is also injected to form the pressure compensation bubble.

The air bubble may also be introduced by applying pressure to the optical element package after filling it with optical coupling liquid. Under pressure, the package compresses slightly and some of the optical coupling liquid will leak out of the package (e.g., through the fill hole), and, after the pressure is released, air is pulled into the package as a vacuum becomes present in the package when the package relaxes to its pre-pressurized size with the reduced liquid volume. Filling of the optical element package may also be performed by inserting the optical coupling liquid at one end of the interior of the optical element package and allowing the fluid to flow into the package via capillary action forces.

If the injection or filling process leaves a hole in the adhesive where injection occurred, a small dab of additional adhesive is applied to seal the injection hole. However, if the injection process is performed before the adhesive is fully cured (e.g., during pot life), or the adhesive is supple enough, further sealing may not needed. The finished product is similar to that illustrated in FIG. 4.

In another construction method, the cover glass is positioned horizontally, and the optical coupling liquid is distributed on a surface of the positioned cover glass (e.g., a light whetting of the inside face of the positioned cover glass). The optical element is then placed on the surface of the optical coupling liquid. An additional amount of optical coupling liquid is then applied to the exposed surface of the optical element (e.g., light whetting), and the second cover glass is placed on the surface of the optical coupling liquid covering the optical element. The two cover glasses are then sealed. The cover glasses may be sealed with an adhesive bead initially placed on one of the cover glasses (preferably the positioned cover glass), or an external seal may be applied to the cover glasses. Adhesive used in the seal is then cured. Any number of alternative techniques or devices may be used to seal the cover glasses.

The finished optical element package includes liquid filled space between the optical element and cover glasses, the liquid filled space having a dimension between the optical element and adjacent cover glasses approximately equivalent to the diameter of the spacer balls used in the package, which are on the order of thousandths of an inch. However, the dimensions of the liquid filled area may vary depending on numerous factors including thickness or shape of the cover glasses or other components of the optical element package. The optical element package itself is preferably of a size similar to retarder sandwich devices that are currently commercially available. Thus, based on the average sized optical element package and the thickness of the liquid filled area, the amount of optical coupling liquid used in the optical package is generally much less than one drop. However, other size packages that are smaller (e.g., miniature optical devices) or larger (e.g., large industrial lighting applications) could be constructed using the same technologies described herein. With various packaging sizes, proportionately varying quantities of optical coupling liquid and other materials are utilized in that package. Also, differing designs may utilize more or less coupling liquid depending on the specifications of the design.

The optical element package will generally be required to be of specific dimensions for fitting into a specific optical device such as a light engine. Some example optical devices in which the optical element package may be installed are discussed in Detro et al., U.S. patent application Ser. No. 10/202,595, entitled "METNOD AND APPARATUS FOR CONFIGURATION AND ASSEMBLY OF A VIDEO PROJECTION LIGHT MANAGEMENT SYSTEM," filed Jul. 24, 2002, the contents of which are incorporated herein by reference in their entirety. Detro et al.'s discussion includes various prism assemblies for video projection Light Management Systems (LMSs), including Liquid Crystal on Silicon (LCoS) based video projection systems, in which the present invention may be applied.

Figure 5:
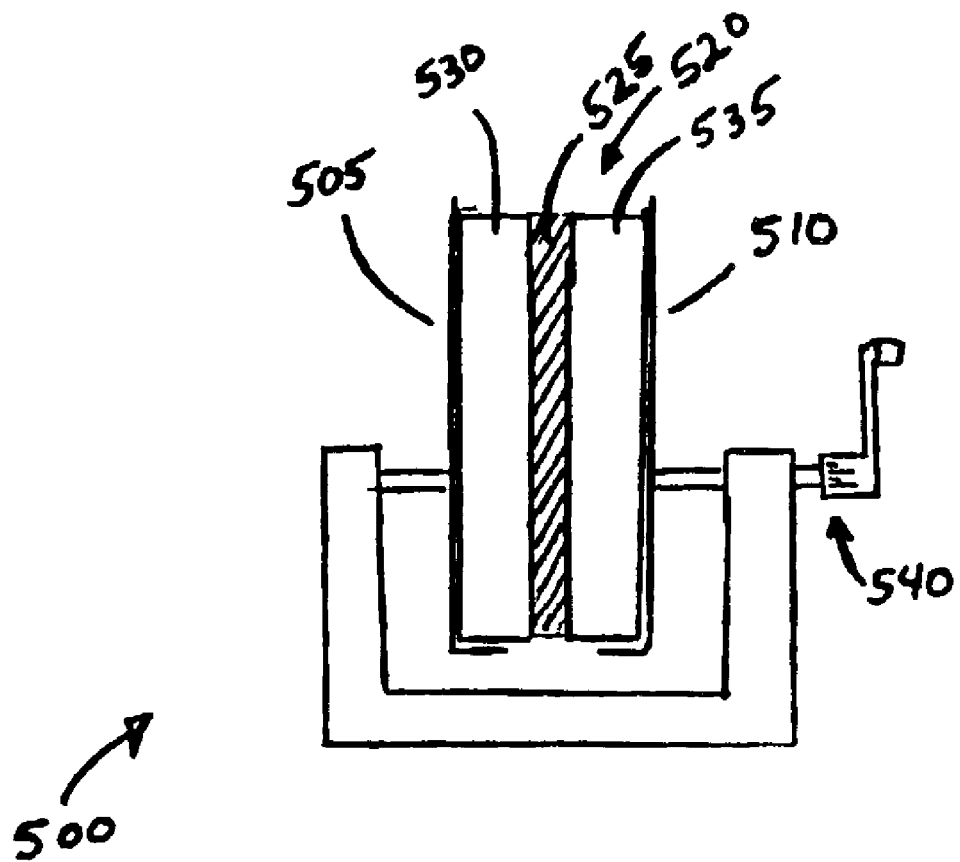
FIG. 5 is an example device used for constructing an optical element package according to the present invention.

Prior to curing the adhesive, the package may be dimensioned according to predefined specifications. The size and shape of the cover glasses and optical elements (which may be square, rectangular, round, triangular, or other predetermined shapes), are generally pre-cut to the appropriate predefined dimensions. To size the thickness of the finished product a precision vise like device 500, as shown in FIG. 5, having L shaped arms 505/510 may be utilized. Prior to curing of the adhesive 525, the optical element package 520 is positioned in the L shaped arms 505/510 which then press against each of the cover glasses 530/535 and adjust the dimensions of the package 520 (e.g., adjusting the amount of interior space between the cover glasses by compressing the adhesive seal). A micrometer adjustment 540 or other precision device moves the L shaped arms 505/510 until the optical element package is dimensioned to a predetermined tolerance. Once the package 520 is within tolerance, the adhesive 525 is cured fixing the optical element package size. The optical coupling liquid and air bubble may be inserted before or after curing, depending on the specific design of the package (e.g., a fill hole fitted in the adhesive would allow for curing prior to injecting the optical coupling liquid and air bubble).

In another alternative, the cover glasses may be fitted into a precisely sized jig having stops or other fixed positions/platforms that provide a fixed and consistent spacing between the cover glasses. Spacer balls are sprayed onto both sides of the optical element and the optical element is inserted between the cover glasses. After inserting the optical element, an external seal that includes a fill hole is applied to both the cover glasses. The optical element package is then filled with optical coupling liquid via the fill hole (leaving an expansion air bubble inside the optical element package), and the fill hole is capped. Alternatively, an interior seal may be applied via a syringe like adhesive applicator. Again, a fill hole may be utilized to fill the package with optical coupling liquid, or, during the uncured state of the adhesive, the liquid may be injected via another syringe through the adhesive to fill empty spaces within the package. Preferably, after curing of the adhesive, the optical element package is removed from the jig and then placed in stock or assembled as part of an optical assembly (e.g., prism assembly, projection TV, light engine, monitor, video device, gaming device, laser device, etc.).

Figure 6:
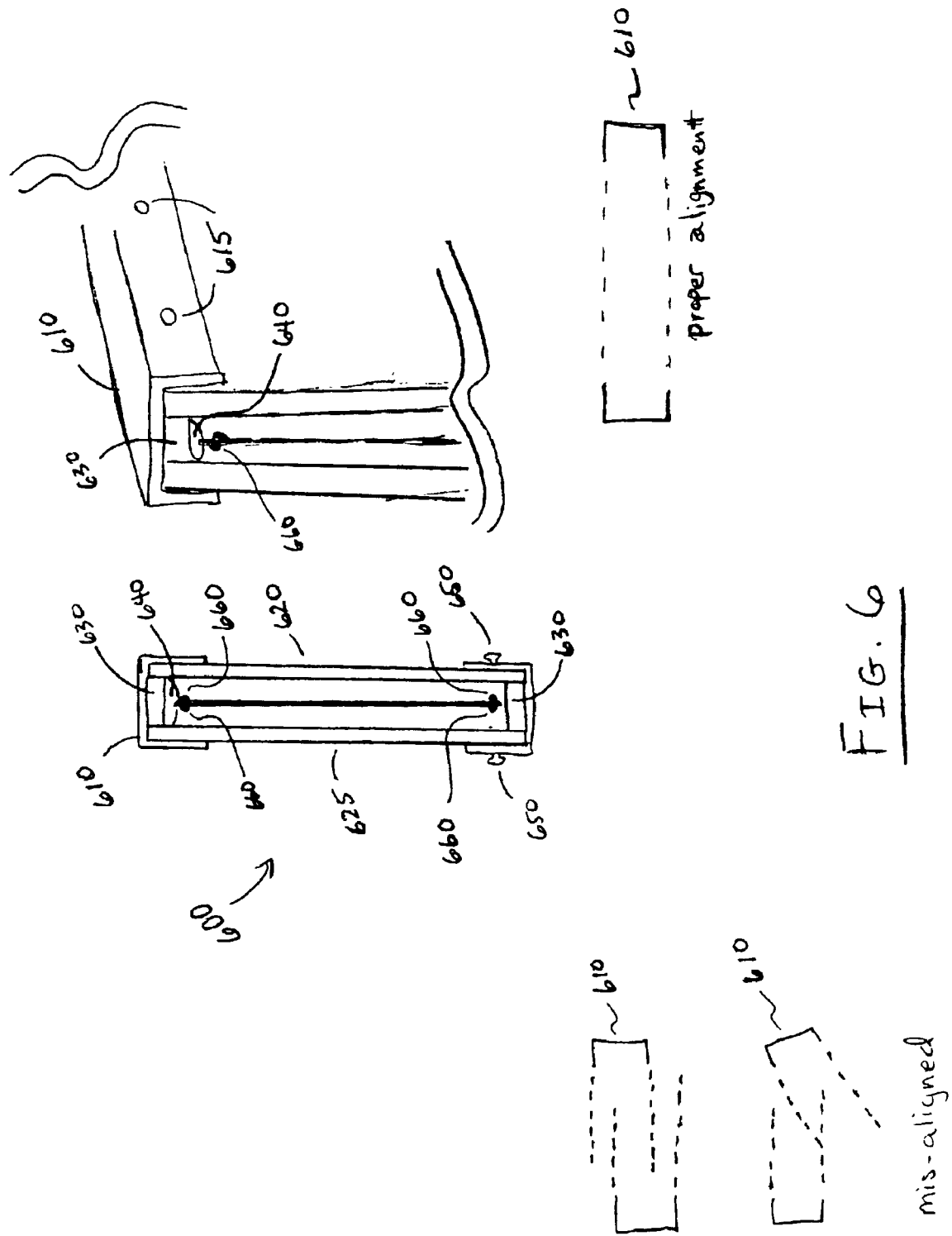
FIG. 6 is an example of a frame used to hold an optical element package according to an embodiment of the present invention.

Alternatively, the optical element package includes a frame. One frame embodiment is illustrated in FIG. 6. An optical element package 600 is fitted into a C shaped frame element 610. The C shaped frame element 610 is precisely and rigidly formed (e.g., constructed of aluminum or another rigid material) in dimensions called for in a optical element dimensional specification. The C shaped frame element 610 may include vacuum holes to which a vacuum pump is fitted to secure cover glasses 620/625 to the frame during production. As shown in FIG. 6, two frame elements are utilized for the optical element package 625. In one embodiment, the frame elements themselves are positioned in a precision jig with stops to assure proper alignment of the frame elements.

After fitting the cover glasses into the frame elements, inserting the optical element (having previously applied spacer dabs of adhesive or spraying spacer balls onto the optical element or interior faces of the cover glasses), and applying adhesive 630, the adhesive 630 is cured. Optical coupling liquid is injected into the optical element package 600 via a through hole in the adhesive (or other location, e.g., through hole in one of the cover glasses, or a through hole in one of the frame elements and adhesive). An air bubble is left inside to compensate for expansion and contraction of the package as a whole (note air bubble 640 at a top of the optical element package near adhesive 630).

After curing, the frame elements may be removed, or the frame elements may be permanently attached to the optical element package via adhesive. In other alternatives, the frame may have flat parts that fit along the gap between cover glasses and aid in holding adhesive in place during injection or poring of the adhesive. The frame is precision sized and provides fixed and consistent spacing of the cover glasses.

Although preferably mounted in a finished product via the use of optical adhesive that secures one or more of the cover glasses to other glass components in the finished product, the frame may also be fitted with stops, notches, hooks, or other devices utilized to fit the optical element package into tracks, slides or other receptacles in a projector or other finished product to which the optical element package is to be fitted. Optical element package 600 includes optional track guides that fit into grooves of a light engine or other optical device into which the package is to be installed.

Using either a jig or precision sized frame, the amount of empty space to be filled with optical coupling liquid varies mainly with differing thicknesses (generally due to non-conforming stock) of the cover glasses and optical elements, as the exterior dimensions are fixed.

Preferably, the optical element is a retarder, such as a wavelength specific retarder. However, the optical packages described by the present invention are suitable for use with a variety of optical elements, including, but not limited to retarders (waveplates), liquid crystal based optical elements (including retarders), polarizers, filters, and color filters.

Although the optical element package is preferably fully self contained between two cover glasses, in one set of embodiments, the optical element is sealed in optical coupling liquid between two optical components, and, at least one of the optical components is not a cover glass. In these embodiments, at least one of the cover glasses is substituted with a surface of an optical component, such as a prism, lens, etc. These embodiments may be advantageous in designs where space is at a premium and the costs of including extra space in the design for a cover glass are outweighed by any savings generated from the convenience of a fully self contained optical package.

As noted above, the invention includes a configuration and means of fabricating optical assemblies (more specifically, O-O-O control elements) such that stress induced birefringence is minimized. The optical assemblies include coupling of optical components via liquid held between the optical components by a seal that is either an adhesive, frame, or other material fixed to the gaps between the optical components. The optical assemblies may include an optical element, such as a retarder material or other optical elements placed between the optical components.

A specific example of an O-O-O control element according to the present invention is now described. However, it should be understood that the various parts and techniques described herein may be applied to a wide range of optical devices other than those specifically described.

Figure 7:
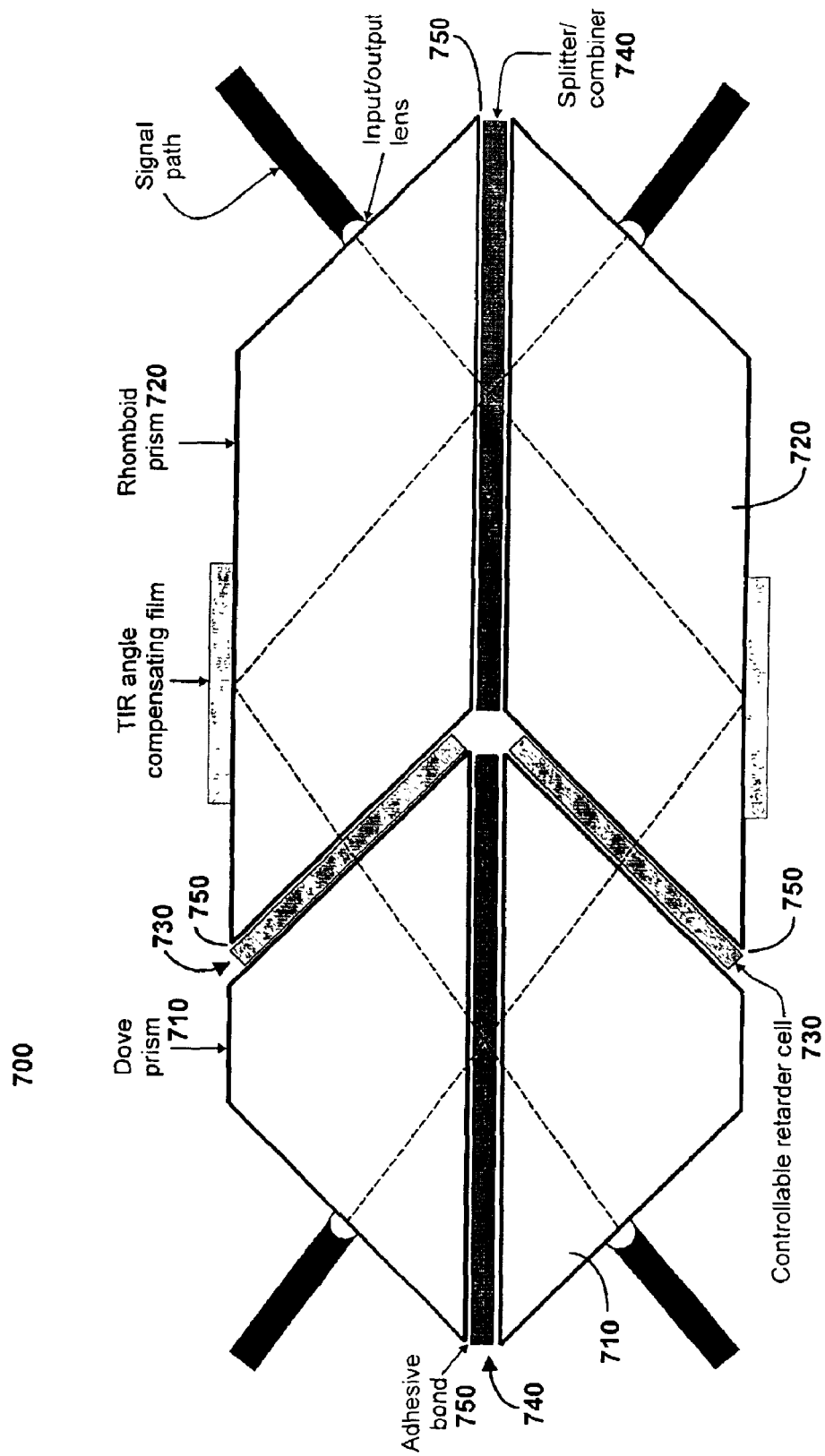
FIG. 7 is a drawing of a conventional photonic switch utilizing adhesive coupled optical components.

First, we look at an example of a known photonic switch that was the subject of the 1996 Phase 1 SBIR project entitled "Photonic Switch for Intra/Inter Equipment Interconnects." The SBIR work was undertaken by SpectraSwitch, Inc. This optical switch 700 is illustrated in FIG. 7. As shown, the internal components of the optic consist of two Dove prisms 710 and two rhomboid prisms 720. Liquid crystal controllable retarders 730 are located between the short faces of differing prisms and liquid crystal splitter/combiners 740 are located between the long faces of similar prisms.

The ability of the optical switch 700 to properly perform its function depends, to a large extent, on how well the polarization of light traveling through the prism can be controlled. Related to this point, one source of concern is that there are six adhesive bonds 750 in the optical path. Each of the adhesive bonds is a potential source of stress and induced birefringence. Making the situation even worse is the fact that the disruptive effects on polarization would be cumulative along any possible optical path.

Figure 8:
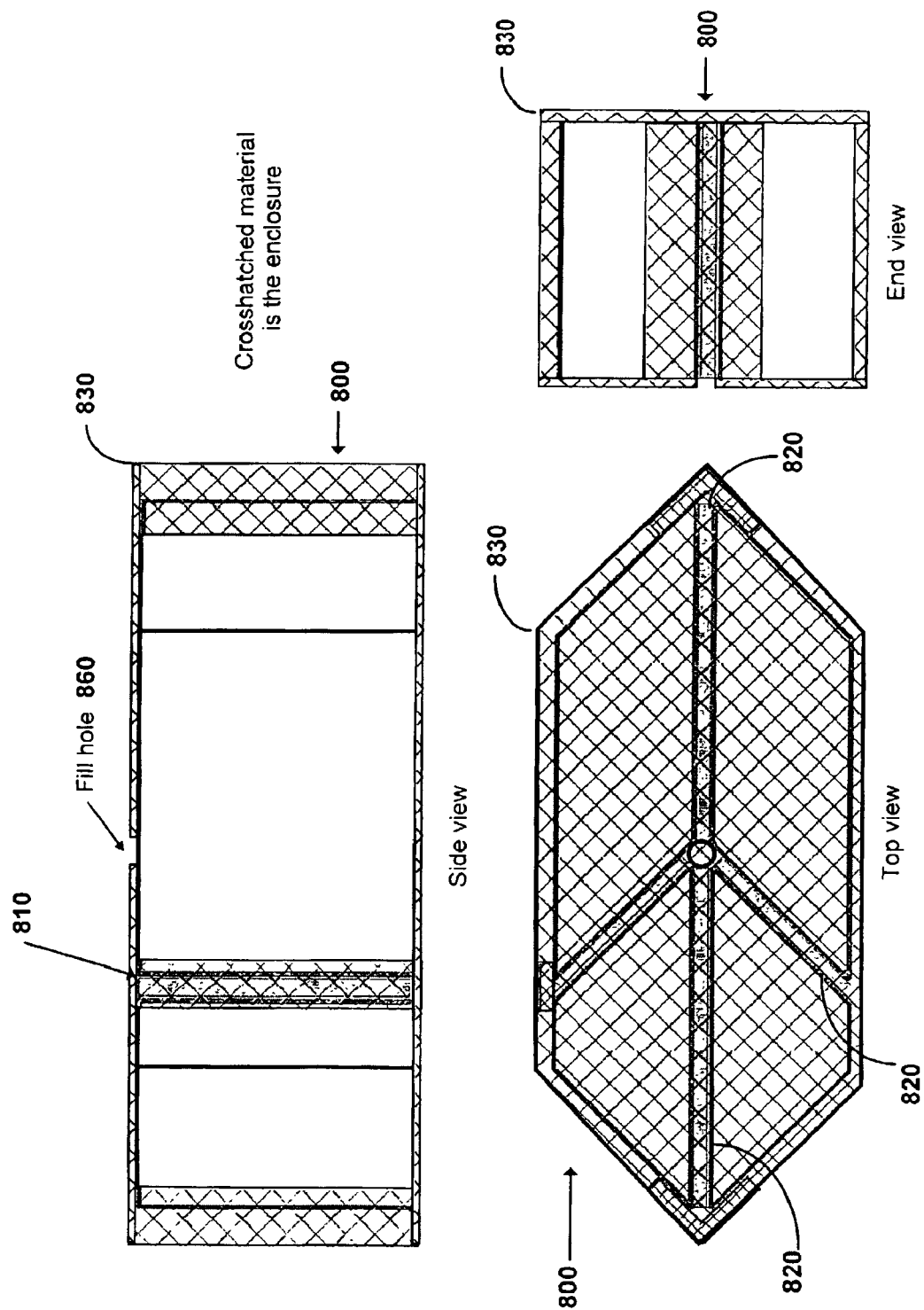
FIG. 8 is a drawing of liquid coupled components of an optical switching device according to an embodiment of the present invention.

The present invention is applied to solve this problem as illustrated in FIG. 8. The new configuration is an optical switch 800 that contains most of the same components as in the optical switch 700. The difference is that all internal adhesive bonds have been eliminated. Instead of adhesive, a liquid 810 fills the gaps (e.g., gaps 820) between the components (e.g., Dove prisms and Rhomboid prisms). The liquid 810 is contained within the prism through the use of an enclosure 830 applied to the exterior of the prism. The enclosure material is selected to have a coefficient of thermal expansion (CTE) that is the same as the principle material in the optical switch 800. In fact, the enclosure can be made of the same glass material as the prism. A thin film of rigid adhesive, such as UV, can be used to bond the enclosure to the exterior of the prism. Use of rigid adhesive at the exterior of the optical switch 800 and any birefringence induced thereby has a smaller if not insignificant effect on the light paths compared to the effects of birefringence and stress that builds up directly in the light paths that occurs in the previous designs from adhesive bonds 750.

Note that in the configuration of FIG. 8 there are no rigid joints along the optical path. The liquid will not transmit stress and stress will not accumulate within the prism, or at least not directly centered on the light paths as in the adhesive joints such as those shown in FIG. 7. The CTE of the enclosure essentially matches that of the prism, and that also will not be a significant source of stress. And, any stress that does accumulate because of the enclosure is on periphery of the light paths, further lessening any adverse effects.

Figure 9:
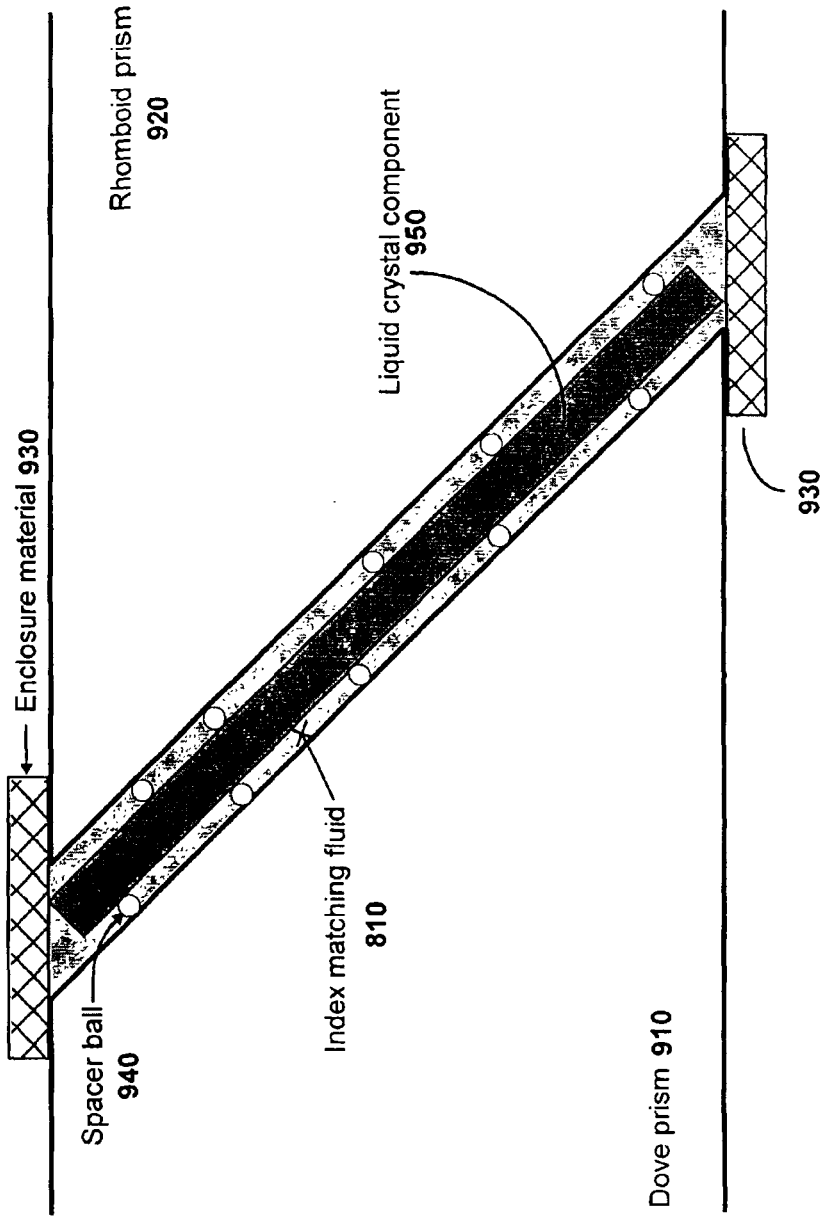
FIG. 9 is a detail view of liquid coupled components using spacers according to an embodiment of the present invention.

There are several practical issues related to implementing the enclosure. The first issue is the means used to keep a small gap between the components. This is needed in order to allow liquid to flow and fully fill the space between the components. A solution is illustrated in FIG. 9. Small glass spacer balls have been distributed (e.g., random) on the faces of the components before their assembly. The index of refraction of the balls matches that of the liquid (and the components). In this way, the balls are rendered essentially invisible. Another solution that may be used to keep a small gap between components is the inclusion of small dabs of adhesive cured on the liquid crystal component 950.

Figure 10:
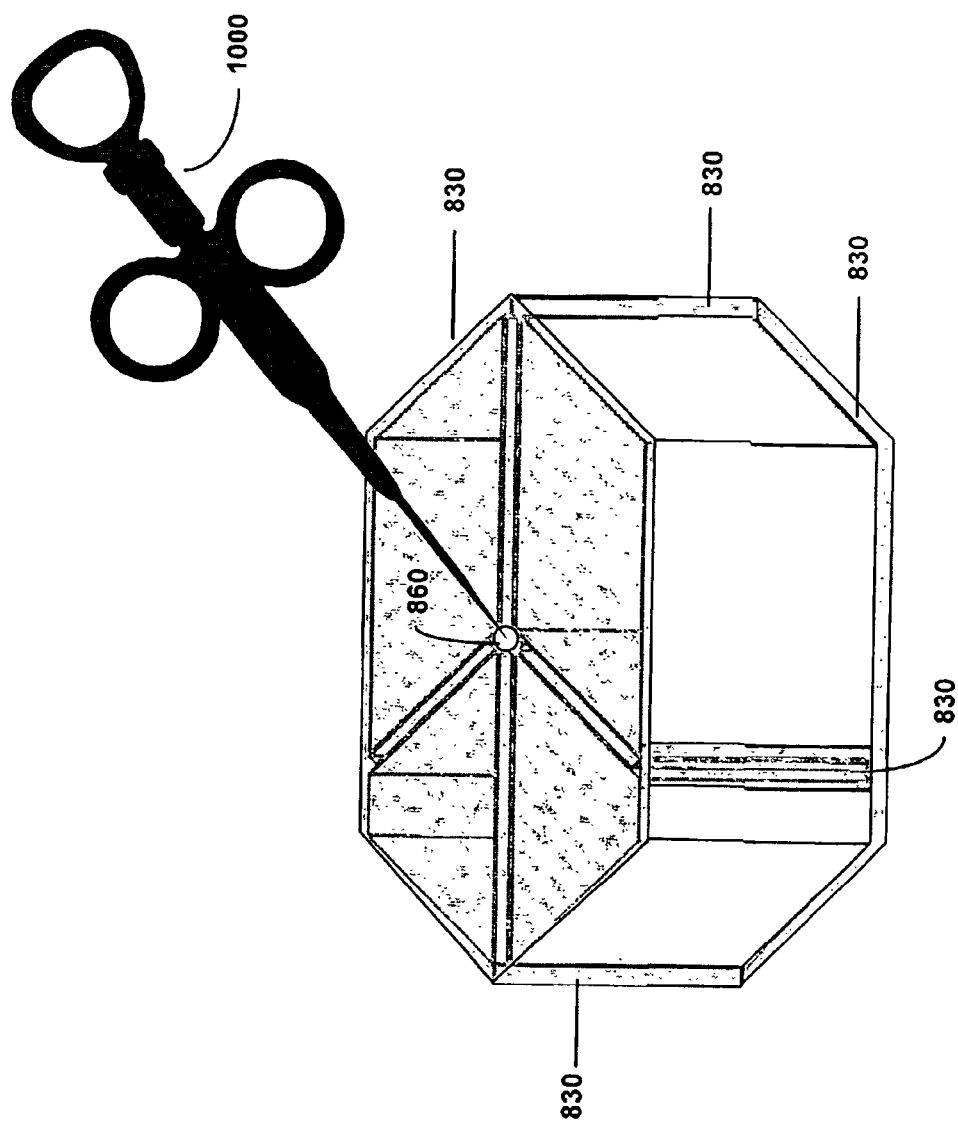
FIG. 10 is an illustration of a filling process of a liquid coupled switching device enclosed in a frame according to an embodiment of the present invention.

A second issue relates to the means by which the liquid is introduced into the enclosure. The approach is to leave a small fill hole 830 in a top plate of the enclosure. As shown in FIG. 10, liquid is introduced through the hole 830 using a syringe-like dispenser 1000, filling the gaps between the components from the bottom up.

Finally, as in the previous embodiments, the liquid filled areas are not filled to capacity and are left with a small amount of air (e.g., air bubble) which expands and contracts to compensate for expansion and contraction of the optical device (O-O-O switching device in this example).

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. For example, when describing an adhesive for making a seal between cover glasses, any other device capable of making a seal, such as a flexible gaskets held in place by adhesive, pressure, or any other means, may be substituted for the adhesive seal. As another example, spacer balls or small dabs of glue utilized to hold the optical element off of the cover glass prior to filling, either of these may be substituted with any device that holds off the optical element and thus facilitate filling of the optical package with optical coupling liquid (e.g., optical fibers, temporary spacers, air pressure variations, air injections, etc., anything that holds the optical element off the cover glasses enough to facilitate filling). Any of the parts or devices described herein may be substituted with other devices or parts having an equivalent function, capability, or result whether or not described herein. Furthermore, the inventors recognize that newly developed technologies not now known may also be substituted for the described parts and still not depart from the scope of the present invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. An optical package comprising:
   first and second cover glasses;
   an optical element disposed between the first and second cover glasses; and
   an optical coupling fluid distributed between the optical element and at least one of the cover glasses;
   wherein:
   said optical package is one component in a prism assembly; and said optical element is a retarder.
2. An optical package comprising:
   first and second cover glasses;
   an optical element disposed between the first and second cover glasses; and
   an optical coupling fluid distributed between the optical element and at least one of the cover glasses; wherein: said optical package is one component in a prism assembly, and said optical element is a filter.
3. An optical package comprising:
   first and second cover glasses;
   an optical element disposed between the first and second cover glasses;
   an optical coupling fluid distributed between the optical element and at least one of the cover glasses; and spacers disposed in the optical coupling liquid, wherein: said optical package is one component in a prism assembly.
4. The optical package according to claim 3, wherein said spacers are sphere shaped.
5. The optical package according to claim 1, further comprising an adhesive placed between each of the cover glasses and configured to maintain a liquid tight area between the cover glasses in which the optical element is disposed.
6. The optical package according to claim 1, wherein the prism assembly is one part in a projection television.
7. The optical package according to claim 3, wherein the prism assembly is one part of a projection television.
8. The optical package according to claim 2, wherein the prism assembly is part of at least one of a projection system, light engine, television, monitor, video device, gaming device, and laser device.
9. A method, comprising the steps of:
   positioning a first cover glass;
   positioning an optical element on the first cover glass;
   forming an adhesive bead on the first cover glass and at least part way around the optical element;
   positioning a second cover glass over the optical element and contacting the adhesive bead; and
   filling an area bounded by the cover glasses and adhesive containing the optical element with an optical coupling liquid;
   wherein said optical element is a retarder.
10. The method according to claim 9, wherein said optical coupling liquid has an index of refraction that closely matches an index of refraction of the cover glasses.
11. The method according to claim 9, wherein said optical element is a wavelength specific retarder.
12. The method according to claim 9, wherein:
    said step of forming an adhesive bead comprises forming an adhesive bead on the first cover glass and completely around the optical element except for a fill hole.
13. The method according to claim 9, wherein:
    said step of forming an adhesive bead comprises forming an adhesive bead on the first cover glass and completely around the optical element.
14. The method according to claim 13, wherein said step of filling comprises injecting the optical coupling liquid through the adhesive.
15. The method according to claim 14, wherein said step of filling occurs during a pot life of the adhesive.
16. The method according to claim 9, further comprising the step of spacing the optical element from the cover glasses.
17. The method according to claim 16, wherein said step of spacing comprises spraying spacer beads on at least one of the optical element and cover glasses.
18. The method according to claim 16, wherein said step of spacing comprises fitting at least one spacer to the optical element.
19. The method according to claim 18, wherein said at least one spacer comprises a dab of adhesive cured on the optical element.
20. The method according to claim 19, wherein said at least one spacer comprises a set of spacers near a perimeter of the optical element.
21. The method according to claim 20, wherein said spacers comprise dabs of adhesive cured on the optical element.
22. The method according to claim 16, wherein said step of spacing comprises fitting spacers to at least one of the cover glasses.
23. The method according to claim 22, wherein said spacer comprise dabs of adhesive cured on the cover glass in positions that hold the optical element off of the cover glass.
24. A method, comprising the steps of:
    fitting an optical element between a first cover glass and a second cover glass;
    sealing the cover classes to create a liquid tight holding area including the optical element between the cover glasses; and filling the holding area with an optical coupling liquid;
wherein the step of sealing comprises forming an adhesive bead on the first cover glass and completely around the optical element except for a fill hole.

25. The method according to claim 24, wherein said optical coupling liquid has an index of refraction that closely matches an index of refraction of the cover glasses.

26. The method according to claim 24, wherein said optical coupling liquid has an index of refraction between an index of refraction of the cover glasses and an index of refraction of the optical element.

27. The method according to claim 24, wherein said step of sealing comprises gluing the cover glasses to a frame.

28. The method according to claim 27, wherein said frame has precision corners fixing outside dimensions of an optical package comprising the cover glasses and optical element.

29. The method according to claim 24, wherein the optical element is a wavelength specific retarder.

30. The method according to claim 24, further comprising the step of spraying spacers onto at least one of the cover glass and optical element surfaces.

31. A method, comprising the step of:
sealing an optical element and an amount of optical coupling liquid between two cover glasses to produce an optical package;
wherein the optical element is a wavelength specific retarder.

32. The method according to claim 31, further comprising the step of spacing the optical element off surfaces of the cover glasses.

33. The method according to claim 32, wherein said step of spacing comprises dabbing an amount of adhesive on surfaces of at least one of the cover glasses and optical element.

34. The method according to claim 32, wherein said step of spacing comprises spraying optical spacers on surfaces of at least one of the cover glasses and optical element.

35. The method according to claim 32, wherein said step of spacing comprises placing at least part of the amount of optical coupling liquid on each of surfaces of the cover glasses and optical element prior to sealing.

36. The method according to claim 31, wherein said step of sealing comprises sealing the optical element, the amount of optical coupling liquid, and an air bubble between the two cover glasses.

37. The method according to claim 36, wherein said air bubble is large enough to compensate for expansion and contraction of the optical package so that optical qualities of the optical package are not compromised.

38. An optical assembly, comprising
at least two optical components separated by a gap;
a frame fitted around the optical components; and
optical coupling fluid in the gap; and
an optical element disposed in said gap and surrounded by the optical coupling fluid;
wherein said optical element comprises a controllable retarder cell.

39. The optical assembly according to claim 38, further comprising spacers disposed in said gap between surfaces of the optical element and adjacent surfaces of the optical components.

40. The optical assembly according to claim 39, wherein:
said optical assembly comprises an O-O-O switch;
said optical components comprise at least two dove prisms and at least two rhomboid prisms;
said spacers are transparent and have an index of refraction approximately equivalent to the optical coupling fluid and said optical components; and
said optical assembly is part of a communications device.

41. The optical assembly according to claim 38, wherein said optical element is a liquid crystal component.

42. The optical assembly according to claim 39, wherein said spacers are transparent and have an index of refraction approximately equivalent to the optical coupling fluid and said optical components.

43. The optical assembly according to claim 38, wherein said optical assembly comprises an O-O-O switch.

44. The optical assembly according to claim 43, wherein said optical components comprise at least two dove prisms and at least two rhomboid prisms.

45. The optical assembly according to claim 38, wherein said optical assembly is part of a communications device.

46. An O-O-O switch, comprising:
a set of optical components configured as an O-O-O switch;
a set of joints between the optical components and in lightpaths of the O-O-O switch;
optical coupling fluid disposed in each of joints; and
an optical element disposed in at least one of the joints;
wherein said optical element is a controllable liquid crystal retarder.

47. The O-O-O switch according to claim 46, further comprising a frame fitted around the optical switch at a juncture of at least two of the set of optical components and covering at least part of said gap.

48. The O-O-O switch according to claim 47, further comprising an adhesive affixed to the frame and said at least two of the set of optical components, said adhesive applied in a manner that creates a water tight seal around interior faces of said at least two of the set of optical components.

49. A method, comprising the steps of:
positioning a set of optical components for use in an optical device;
fixing a frame around at least two of the optical components and a gap between the at least two optical components;
filling interior spaces bounded by the at least two optical components and the frame with optical coupling fluid; and
inserting an optical element between the at least two optical components;
wherein said step of filling interior spaces comprises the step of leaving an amount of air in the interior spaces.

50. The method according to claim 49, wherein:
said frame includes a fill hole;
said step of filling comprises inserting a fill device into the fill hole and filling the interior spaces.

51. The method according to claim 50, wherein said step of inserting comprises inserting the fill device into the fill hole to a bottom area of the optical device and filling the interior spaces from the bottom up.

52. The method according to claim 50, wherein said fill device comprises a thin needle like injector.

53. The method according to claim 49, wherein said step of filling comprises filling the interior spaces from a bottom up.

54. The optical package according to claim 1, further comprising dabs of glue placed along a perimeter of the optical package.

55. The optical package according to claim 54, wherein the dabs of glue are placed outside intended lightpaths of the optical package.

56. The optical package according to claim 1, wherein the optical element is a retarder in a lightpath of a Liquid Crystal on Silicon (LCoS) projection television.

57. The optical package according to claim 2, wherein the optical element is a filter in a lightpath of a Liquid Crystal on Silicon (LCoS) projection television.

58. An optical package comprising:

first and second cover glasses;

an optical element disposed between the first and second cover glasses; and an optical coupling liquid distributed between the optical element and at least one of the cover glasses;

wherein:

said optical package is one component in a prism assembly; and the prism assembly is one part of a projection television; and the optical element is a polarizing film.

59. An optical package according to claim 1, wherein the optical element is a wavelength specific retarder.

60. An optical package comprising:

first and second cover glasses;

an optical element disposed between the first and second cover glasses; and an optical coupling liquid distributed between the optical element and at least one of the cover glasses;

wherein:

said optical package is one component in a prism assembly; and the prism assembly is part of a Light Management System (LMS) in a Liquid Crystal on Silicon (LCoS) projection television.

61. An optical package comprising:

first and second cover glasses;

an optical element disposed between the first and second cover glasses; and an optical coupling liquid distributed between the optical element and at least one of the cover glasses;

wherein:

said optical package is one component in a prism assembly; and the prism assembly is one part of a projection television; and the projection television is a Liquid Crystal on Silicon (LCoS) television.

62. The method according to claim 31, further comprising the step of using the optical component in a Liquid Crystal on Silicon (LCoS) television.

63. The method according to claim 9, wherein the retarder is a wavelength specific retarder placed in a projection monitor.

64. The method according to claim 63, wherein the projection monitor is part of a Liquid Crystal on Silicon (LCoS) television.

* * * * *